United States Patent [19]

Rainville

[11] 4,315,631
[45] Feb. 16, 1982

[54] TRAILERS FOR ELONGATED LOADS

[76] Inventor: Edmond Rainville, 135 Homeside Ave., Stoney Creek, Ontario, Canada, L8G 3G9

[21] Appl. No.: 18,538

[22] Filed: Mar. 8, 1979

[51] Int. Cl.³ .................................... B62D 37/00
[52] U.S. Cl. .................. 280/6 H; 280/678; 280/43.23; 280/104
[58] Field of Search ............. 280/43.18, 43.22, 43.23, 280/6 H, 104, 678, 683, 104

[56] References Cited

U.S. PATENT DOCUMENTS

| | | | |
|---|---|---|---|
| 2,452,105 | 10/1948 | Cosentino | 280/104 |
| 2,560,625 | 7/1951 | Boggs, Jr. | 280/43.18 |
| 3,183,016 | 5/1965 | Gustafsson | 280/104 X |
| 3,197,231 | 7/1965 | Holzman | 280/6 H X |
| 3,313,556 | 4/1967 | Colwell | 280/43.18 X |
| 3,433,493 | 3/1969 | Hirst | 280/104 X |
| 3,703,298 | 11/1972 | Laverda | 280/6 H |
| 3,836,161 | 9/1974 | Buhl | 280/6 H |
| 3,885,691 | 5/1975 | Krapp | 280/43.23 X |
| 3,899,037 | 8/1975 | Yuker | 280/6 H |
| 3,912,288 | 10/1975 | F'Geppert | 280/6 H |
| 3,933,359 | 1/1976 | Wallace | 280/6 H |
| 4,058,325 | 11/1977 | Schramm | 280/43.18 |
| 4,120,513 | 9/1978 | Hurt | 280/43.23 X |

Primary Examiner—David M. Mitchell
Assistant Examiner—Norman L. Stack, Jr.
Attorney, Agent, or Firm—Hirons, Rogers & Scott

[57] ABSTRACT

A trailer for elongated loads, especially for torsionally-sensitive loads, such as a crane boom, consists of a channel cross-section body having a plurality of wheels at each side to the rear. Each wheel is independently mounted on the trailer frame by a cranked arm pivoted to the frame and carrying the wheel on a stub axle. Normal road shocks are accommodated by helical compression springs mounted around the piston rod of a respective cylinder and piston assembly mounted above the wheel between the arm and the trailer frame, the assembly permitting the height of the trailer frame above the ground to be adjusted. The cylinders of each plurality are connected to one another for equalization and all of the cylinders are connected together for slow travel over rough terrain so that the trailer stays relatively level if any one wheel encounters an obstacle. For rapid travel on smooth roads the cylinders of one plurality are isolated from those of the other plurality by a valve in the hydraulic supply system. The front end of the trailer is provided with a vertically adjustable cross-bar having coarse and fine vertical adjustment.

9 Claims, 8 Drawing Figures

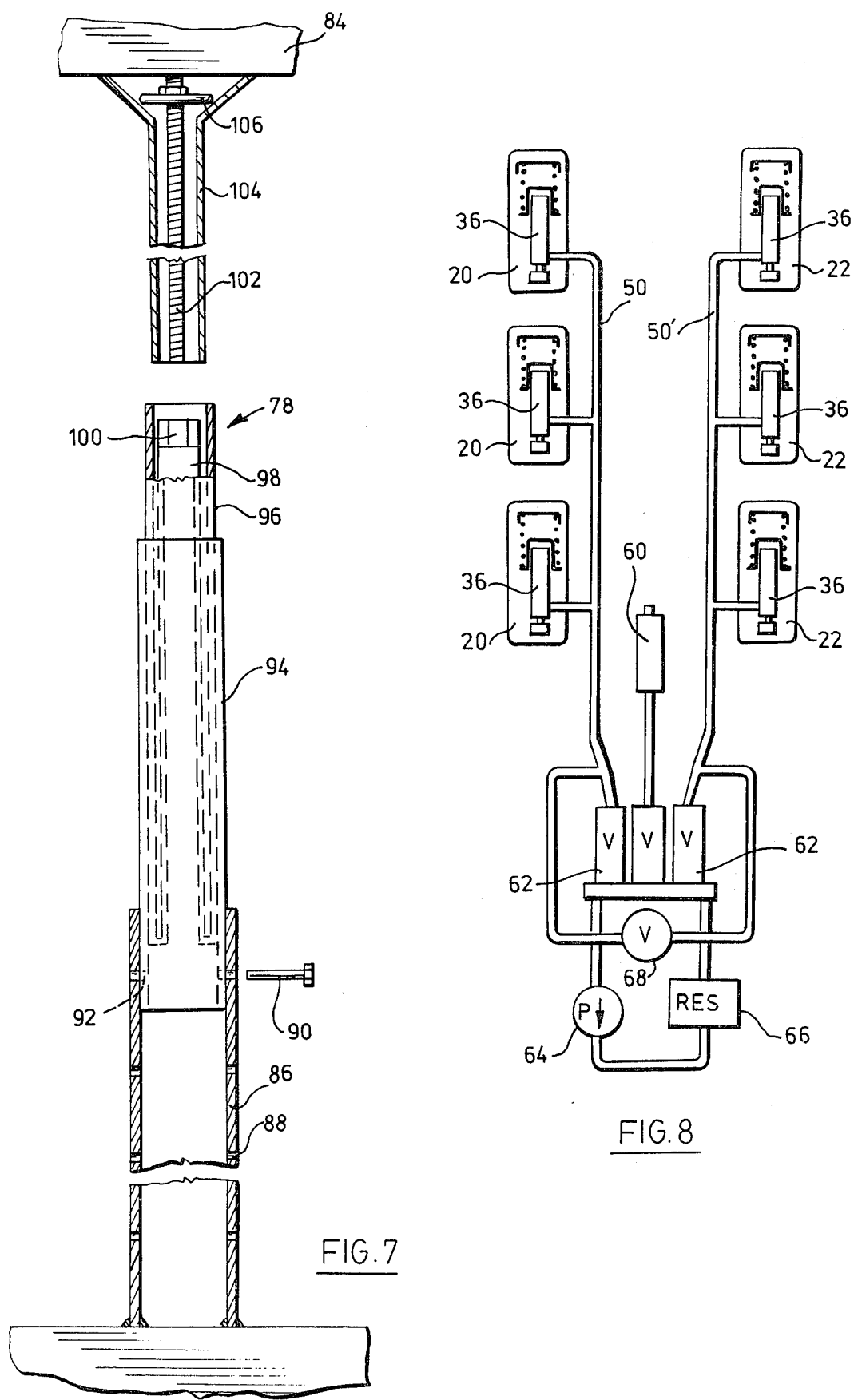

TRAILERS FOR ELONGATED LOADS

FIELD OF THE INVENTION

The present invention is concerned with improvements in or relating to trailers for elongated loads, and especially but not exclusively to trailers especially suited for elongated, torsionally-sensitive loads.

REVIEW OF THE PRIOR ART

The carriage of long, torsionally-sensitive loads on first class highways presents no unusual difficulties since such highways provide a very smooth surface without bumps, obstructions, etc. The situation is very different however when such loads are to be transported over a rough terrain, such as a new construction site, the access to which may involve travel over extremely bumpy, rutted paths. A particular example of an elongated torsionally-sensitive load is a crane boom which while extremely strong in the longitudinal direction, is easily distorted and damaged if twisted excessively during transport and, once so twisted, cannot be used without danger of collapse, and so must be returned for repairs. The damage to the crane boom itself is of course costly to repair, but the economic consequences usually are much more extensive, since such cranes are usually leased on a tight schedule in a construction project, and loss of the crane's service at the scheduled time can cause costly delays.

A novelty search performed prior to the preparation and filing of this application was carried out in Class 280 (Land Vehicles) and the following subclasses:
43.23
  Wheeled extensible vehicles with power operated actuator.
104
  Wheeled running gear with equalised frame
676
  As 104 with tandem axles.
The following U.S. Patents were noted as a result:
43.23
  U.S. Pat. No. 2,560,625—Boggs Jr. et al
  U.S. Pat. No. 2,621,942—Getz
  U.S. Pat. No. 2,644,696—Bill
  U.S. Pat. No. 2,902,288—Dill
  U.S. Pat. No. 3,635,492—Moulder
104 & 676
  U.S. Pat. No. 2,395,640—Pearson
  U.S. Pat. No. 2,452,105—Corentino
  U.S. Pat. No. 2,610,073—Lilly Sr.
  U.S. Pat. No. 2,828,138—Brueder

DEFINITION OF THE INVENTION

It is therefore an object of the invention to provide a new trailer especially suited for the carriage of elongated torsionally-sensitive loads.

In accordance with the present invention there is provided a new trailer for the carriage of elongated torsionally-sensitive loads comprising:

(a) an elongated trailer frame of channel cross-section having two pluralities of running wheels at its rear end with one plurality at each of its sides, (b) mounting means including hydraulic piston and cylinder means for each running wheel mounting the wheel on the frame for vertical movement relative to the trailer frame by supply of operating liquid to the hydraulic piston and cylinder means and discharge of operating liquid therefrom, (c) pipe means for supplying operating liquid to all of the said hydraulic piston and cylinder means, and (d) valve means in said pipe means operable between one position for slow travel of the trailer over rough terrain, in which all of the piston and cylinder means are connected together, whereby operating liquid discharged from one piston and cylinder means is fed to all of the other piston and cylinder means, and another position for fast travel over smooth terrain in which the piston and cylinder means of one plurality are isolated from the piston and cylinder means of the other plurality.

Also in accordance with the present invention there is provided a trailer for the carriage of elongaged torsionally-sensitive loads comprising:

(a) an elongated trailer frame of open-topped channel cross section having two spaced side walls, having a fifth wheel connection at its front end and having at its rear end two pluralities of running wheels, one at each of its sides, (b) mounting means for each wheel mounting it on the frame for spring suspension of the frame from the wheel and for adjustment of the height of the frame from the ground, (c) each mounting means comprising an arm member pivoted to the trailer frame to lie and move alongside the respective side wall and carrying a stub axle on which the respective wheel is mounted to lie alongside the arm member, and (d) a hydraulic piston and cylinder means for each running wheel mounted above the wheel and connected between the trailer frame and the arm member, for vertical movement of the wheel relative to the frame by supply of operating liquid to the hydraulic piston and cylinder means and discharge of operating liquid therefrom.

DESCRIPTION OF THE DRAWINGS

A trailer which is a particular preferred embodiment of the invention will now be described, by way of example, will reference to the accompanying diagrammatic drawings wherein:

FIG. 7 is a longitudinal cross-section through a forward mounting element of the trailer employed for crane booms, and FIG. 8 is a schematic diagram of the hydraulic circuit of the trailer suspension.

DESCRIPTION OF THE PREFERRED EMBODIMENTS

Figure 1:
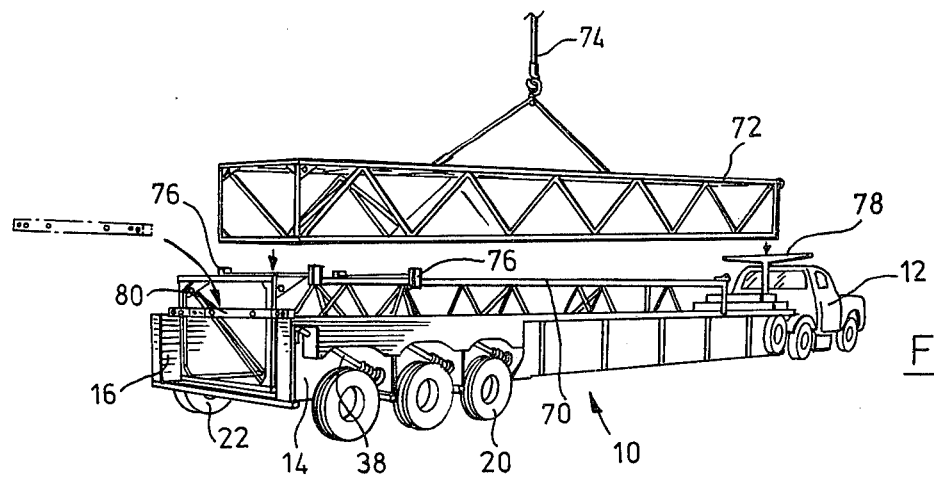
FIG. 1 is a general perspective view of the trailer, together with its tractor, and illustrating the loading thereon of a two part crane boom, as an example of an elongated torsionally-sensitive load to be carried thereby.

The trailer of the invention is indicated generally by the reference 10 and is drawn by a tractor 12. The trailer is of deep open-topped channel cross-section with straight parallel sides 14 and 16 formed by reinforced sheet metal panels and joined along their bottom edges by transverse connecting bars 18. At its rear end the trailer is provided with two pluralities of running wheels 20 and 22, one mounted on each side; in this embodiment each plurality consists of three wheels, the minimum of course being two. At its front end the trailer is provided with a king pin (not seen) for connecting the trailer to the fifth wheel plate 24 of the tractor 12.

Figure 5:
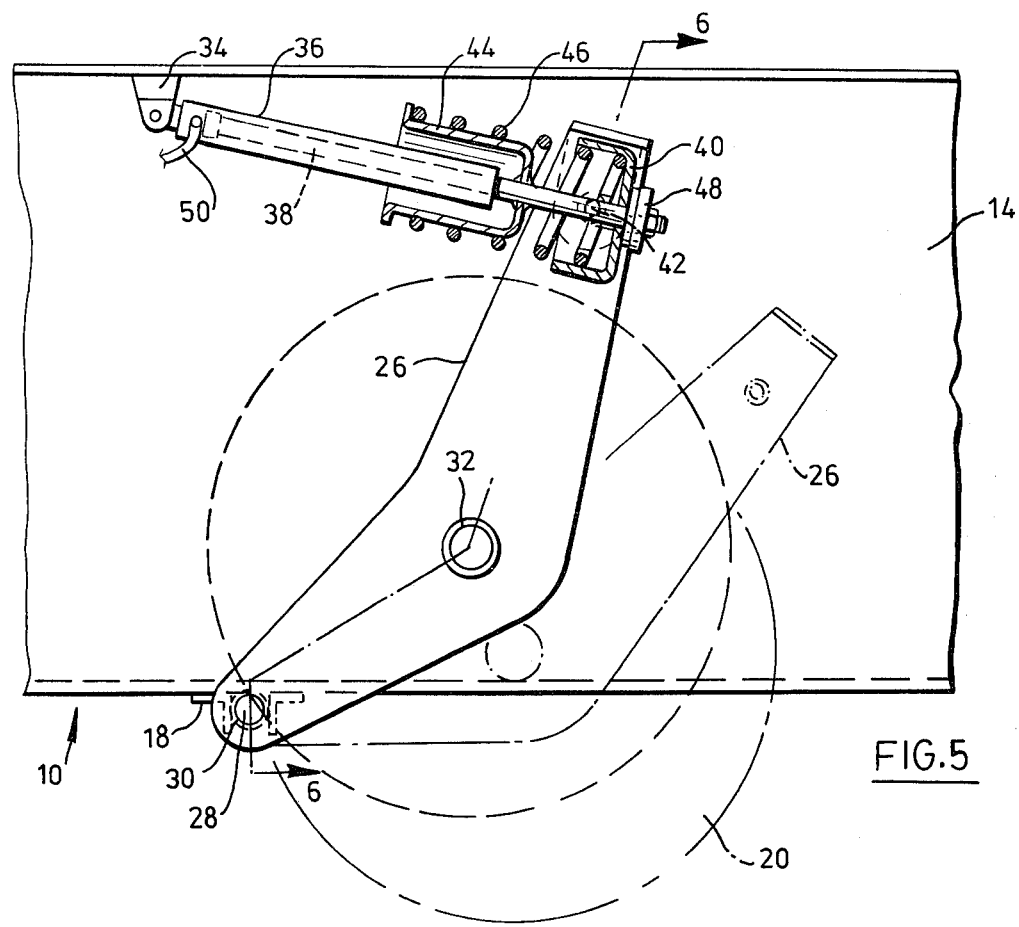
FIG. 5 is a side elevation, with parts broken away as necessary for clarity of illustration, of the suspension for one of the trailer wheels.
Figure 6:
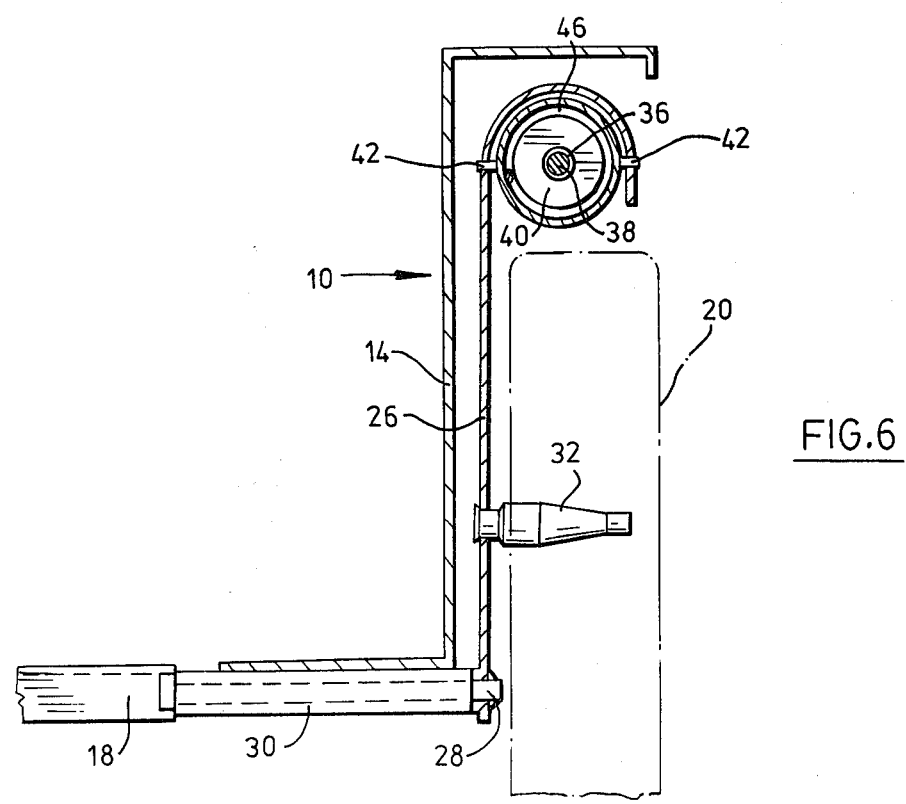
FIG. 6 is a section taken on the line 6—6 of FIG. 5.

Each of the running wheels 20 or 22 is mounted to the trailer frame by mounting means shown in FIGS. 5 & 6, consisting of a cranked arm member 26 pivoted at its lower end by a shaft 28 to the frame via a tubular bearing sleeve 30 and carrying at an intermediate point along its length a stub axle 32 on which the respective wheel is mounted so as to lie alongside the arm member. The upper end of the cranked arm member is connected by a hydraulic piston and cylinder member to a bracket 34 on the trailer frame. Each piston and cylinder member consists of a cylinder 36 pivoted at one end to the bracket 34 and mounting therein a single-acting piston 38, the protruding end of the piston rod being connected to the arm member 26 by a cup-shaped member 40 pivoted at 42 to the arm member, and through the bottom of which the piston rod extends for longitudinal movement relative thereto. Another cup-shaped member 44 is fixed to the piston rod and a helical compression spring 46 is interposed between the members 40 and 44 so as to urge the member 40 against a stop 48 on the end of the piston rod. The spring therefore resists movement of the cup member along the rod under the action of forces applied to it by the respective wheel. Hydraulic fluid under pressure is fed to the bottom end of the cylinder 36 via pipe 50, liquid exiting from the top end of the cylinder via pipe 52.

It will be noted especially from FIG. 6 that the body of the trailer is deep and open from front to rear with transverse members 18 only beneath the floor line. The location of the units 36-48 above the wheels permits them to be accommodated in a relatively narrow space not much wider than the wheel itself, so that the trailer body can be of maximum width for normal width gauge of the entire trailer.

Figure 2:
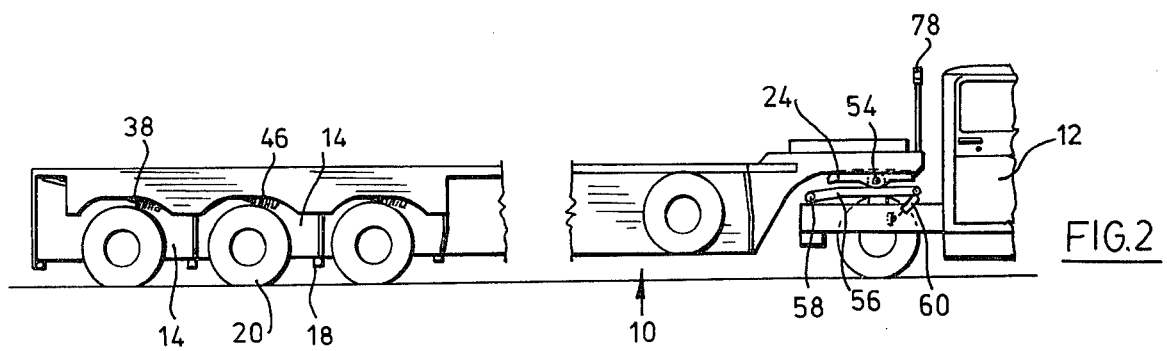
FIG. 2 is a shortened side elevation of the trailer and tractor of FIG. 1.
Figure 3:
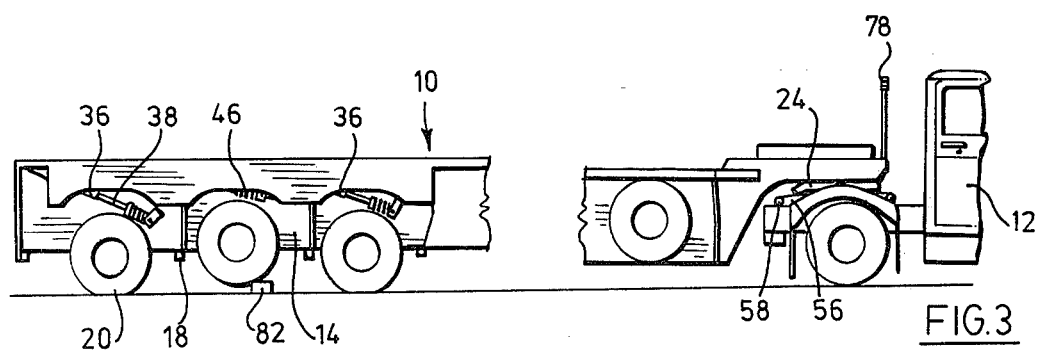
FIG. 3 is a similar view t FIG. 2 to show the manner in which the trailer suspension is operative upon a wheel encountering an obstacle.
Figure 4:
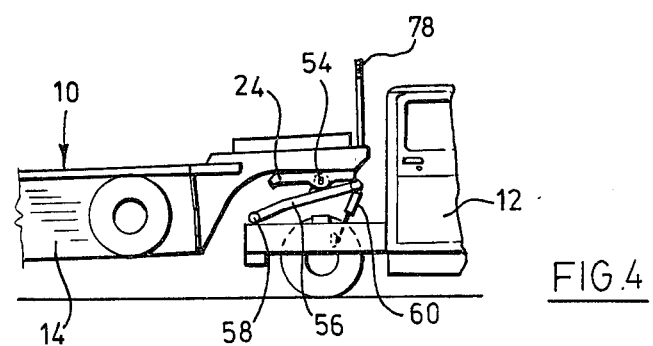
FIG. 4 shows in greater detail the operation of the fifth wheel connection between the trailer and tractor.

As will be seen from FIGS. 2, 3 and 4 the fifth wheel plate 24 of the tractor is pivoted about a horizontal axis 54 to a frame 56 that is in turn pivot about a horizontal axis 58 to the tractor frame, the elevation of the front end of the frame 56, and thus of the plate 24, and thus of the front end of the trailer, being adjustable by means of a hydraulic unit 60 connected between the tractor frame and front end of the frame 56.

Referring now also to FIG. 8, each of the three cylinders 36 operative with the wheels 20 are connected to one bank of a multibank control valve 62 by a common pipe 50, while the three cylinders 36 operative with the wheels 22 are connected to another bank of the valve 62 by a common pipe 50'.

The valve banks are supplied with operating liquid from a pump 64 and a reservoir 66. The unit 60 of the fifth wheel is also controlled from the third bank of the valve 62. A valve 68 is connected between the two pipes 50 and 50' and connects them together when open, or isolates them from one another when closed.

In operation, if required, the trailer can be lowered to the ground by operating the valve 62 to exhaust fluid from the units 36, the valve 68 being open so that the pipes 50 are connected and all of the units are exhausted simultaneously and equally, the arms 26 lifting to the position shown in solid lines in FIG. 5, and the wheels 20 and 22 to the position shown in broken lines. The plate 24 is also lowered to the position shown in FIGS. 2 and 3. The trailer can now be loaded, this being faciliated with some loads, e.g. a vehicle, by the trailer being so low on the ground. FIG. 1 illustrates the loading of a two-section crane boom 70 and 72 by means of a hoist 74, the sections tapering from rear to front. The larger section is laid directly on the trailer bed and cross-bars 76 to receive the smaller section are laid over the rear end of the larger section. The smaller section is then placed on top of the larger section with its rear end lying on the cross bars 76 and its front end supported by an adjustable-height cross-bar member 78, the construction of which is shown in detail in FIG. 7. The sections are now secured by straps (not shown) and a tail-light bar 80 carrying the necessary tail lights and license plates plugged in and put in place for travel.

The valve 62 is now operated with the valve 68 closed to raise the trailer from the ground and to lift the plate 24 to the running position shown in FIG. 4, the arms 26 moving to the position shown in broken lines in FIG. 5, while the wheels 20 and 22 are in the position shown in chain dotted lines. The units 36 for the wheels 20 are independent from those for the wheels 22 and it may be found necessary to use a higher liquid pressure in one set from the other to bring the trailer to a level altitude. Moreover, shifts of effective loading on the units on one side as the trailer rounds a corner or curve, do not effect the units on the opposite side, which would happen if all the units were connected together by the open valve 68. The trailer is now ready for high speed normal running on a smooth good-class highway, normal road shocks and bumps being absorbed by the springs 46.

When the trailer is to traverse any kind of rough terrain, such as a construction site and/or the access road thereto, the valve 68 is opened so that all of the units 36 are connected together. If any one of the wheels encounters an obstacle, for example the obstacle 82 illustrated in FIG. 3, that wheel will lift and any liquid forced from the cylinder 36 will feed equally to all the other cylinders, even those on the other side. As the trailer travels slowly over this rough terrain therefore such obstacles will be traversed with a minimum of twisting torque applied to the trailer body and to its load, normally sufficiently below the torque value that would damage the boom sections.

Referring to FIG. 7 the cross-bar member 78 provides both coarse and fine vertical adjustment of the height of the cross-bar 84 in a rigid construction and consists of a vertically-extending first tube 86 welded to the trailer frame. This tube has a plurality of vertically-spaced diametrically opposed holes 88 that can receive a pin 90, the pin also passing through holes 92 at the bottom end of a second tube 94 telescoping into the tube 86; this provides the coarse vertical adjustment. Two concentric tubes 96 and 98 are fixed into the tube 94, the inner tube 98 having at its top end a nut 100 that is engaged by a screw 102 mounted within a tube 104 fixed to the cross bar 84 and moving in the annular space between the tubes 96 and 98. The screw 102 is rotated by a hand wheel 106, and this provides the fine vertical adjustment.

It will be seen therefore that I have provided a trailer of new and particularly commercially useful type, especially suited for the carriage of torsionally-sensitive loads, but equally suited for the carriage of other types of load.

I claim:

1. A trailer for the carriage of torsionally-sensitive elongated loads comprising:
   (a) an elongated trailer frame of channel cross-section having a grouped plurality of running wheels at each side of its rear end,
   (b) mounting means independently mounting each wheel to the trailer frame comprising a stub axle for each wheel,
   (c) hydraulic piston and cylinder means for each running wheel connected between the trailer frame and the respective stub axle and permitting vertical movement of the respective wheel relative to the trailer frame by supply of operating liquid to the hydraulic piston and cylinder means and discharge of operating liquid therefrom,
   (d) pipe means for supplying operating liquid to all of the said hydraulic piston and cylinder means, and
   (e) valve means in said pipe means operable between one position in which all of the piston and cylinder means for all wheels of both grouped pluralities are connected together, whereby operating liquid fed to and discharged from one piston and cylinder means as the result of vertical movement of the respective wheel is respectively discharged from and fed to all of the other piston and cylinder means to provide an averaging effect of the movement of the said wheel among all the other wheels for reduction of the application of torsional forces to the torsionally-sensitive load, and another position in which the piston and cylinder means for all the wheels on each plurality only are connected together, the connected-together piston and cylinder means of one plurality on one side being isolated from the connected-together piston and cylinder means of the other plurality on the other side, so that the said averaging effect of the movement of any wheel is confined to the other wheels of the plurality on the same side.

2. A trailer as claimed in claim 1 wherein, for each wheel, the said mounting means consists of an arm member pivoted at a pivot to the trailer frame and carrying said stub axle at a point spaced from the pivot on which the respective wheel is mounted to lie alongside the arm member, and wherein the respective hydraulic piston and cylinder means for the wheel is mounted above the wheel and connected between the trailer frame and the arm member.

3. A trailer as claimed in claim 2, wherein, for each wheel, the said mounting means includes a first member on the piston rod slidable on the piston rod and pivotally connected to the arm member, a stop on the piston rod engaging the first member, a second member on the piston rod, and a compression spring operative between the first and second members to resist movement of the first member along the piston rod under the action of forces applied thereto by the respective wheel.

4. A trailer as claimed in claim 1, in combination with a tractor body having a fifth wheel plate and comprising:

a frame on which the fifth wheel plate is mounted for tilting movement about a horizontal axis,
the said frame being mounted on the tractor body for tilting movement about another horizontal axis, and
hydraulic motor means connected between the said frame and the tractor body and operable to tilt the frame and thereby the height of the fifth wheel plate above ground.

5. A trailer as claimed in claim 1, and including at its front end a cross-bar member comprising:
a first vertically-extending tubular member fastened to the frame,
anoher tubular member telescopable in the first member, pin means extending through registering holes in the tubular members to fasten them together with coarse adjustment of their telescoped height, a further tubular member telescoped in said another member and carrying a cross-bar, and a screw member operative between the another and further members for fine adjustment of their telescoped height.

6. A trailer for the carriage of elongated torsionally sensitive loads comprising:
   (a) an elongated trailer frame of open-topped channel cross section having two spaced side walls, having a fifth wheel connection at its front end and having at its rear end at each of its side a respective grouped plurality of running wheels,
   (b) mounting means for each wheel mounting it on the trailer frame for spring suspension of the frame from the wheel and for adjustment of the height of the frame from the ground,
   (c) each mounting means comprising an arm member pivoted to the trailer frame to lie and move alongside the respective side wall and carrying a stub axle on which the respective wheel is mounted to lie alongside the arm member, and
   (d) a hydraulic piston and cylinder means for each running wheel connected between the trailer frame and the arm member, for vertical movement of the wheel relative to the frame by supply of operating liquid to the hydraulic piston and cylinder means and discharge of operating liquid therefrom; and
   (e) pipe and valve means connecting the hydraulic piston and cylinder means for the running-wheels for averaging the movement of any wheel selectively by operation of the valve means among all the wheels for reduction of the application of torsional forces to the torsionally-sensitive load or among only the wheels of its own plurality;
in combination with a tractor body having a fifth wheel plate and comprising:
   (f) a frame mounting on the tractor body and on which the fifth wheel plate is mounted for tilting movement about a horizontal axis, the said frame being mounted on the tractor body for tilting movement about another horizontal axis, and
   (g) hydraulic motor means connected between the said frame and the tractor body and operable to tilt the frame about said another axis and thereby change the height of the fifth wheel plate above ground.

7. A trailer as claimed in claim 6, wherein the said mounting means for each wheel includes a first member on the piston rod slidable on the piston rod and pivotally connected to the arm member, a stop on the piston rod engaging the first member, a second member on the piston rod, and a compression spring operative between the first and second members to resist movement of the first member along the piston rod under the action of forces applied thereto by the respective wheel.

8. A trailer as claimed in claim 6, in combination with a tractor body having a fifth wheel plate and comprising:
- a frame on which the fifth wheel plate is mounted for tilting movement about a horizontal axis,
- the said frame being mounted on the tractor body for tilting movement about another horizontal axis, and
- hydraulic motor means connected between the said frame and the tractor body and operable to tilt the frame and thereby the height of the fifth wheel plate above ground.

9. A trailer as claimed in claim 6, and including at its front end a cross-bar member comprising:
- a first vertically-extending tubular member fastened to the frame,
- another tubular member telescopable in the first member, pin means extending through registering holes in the tubular members to fasten them together with coarse adjustment of their telescoped height, a further tubular member telescoped in said another member and carrying a cross-bar, and a screw member operative between the another and further members for fine adjustment of their telescoped height.

* * * * *